United States Patent [19]

Ouriet et al.

[11] 4,184,664

[45] Jan. 22, 1980

[54] EXPANDING MANDREL AND A MACHINE FOR THE USE OF SAID MANDREL

[75] Inventors: Jean P. Ouriet, Antony; Albert Recule, Igny; Georges Roll, Malakoff, all of France

[73] Assignee: Commasariat a l'Energie Atomique, Paris, France

[21] Appl. No.: 897,881

[22] Filed: Apr. 19, 1978

[30] Foreign Application Priority Data

Apr. 22, 1977 [FR] France ................. 77 12176

[51] Int. Cl.² ............................................. B60C 25/14
[52] U.S. Cl. ................. 254/50.2; 242/72 R; 269/48.1; 279/2 R
[58] Field of Search ............... 254/50.1–50.4; 269/48.1, 32; 73/146; 279/2 R, 2 A; 242/72 R, 72 B

[56] References Cited

U.S. PATENT DOCUMENTS

| | | | |
|---|---|---|---|
| 2,541,659 | 2/1951 | McGovern | 254/50.3 |
| 2,986,443 | 5/1961 | Leütert | 242/72 R |
| 3,386,726 | 6/1968 | Lorenz | 269/32 |
| 3,583,674 | 6/1971 | Hall | 254/50.2 |

Primary Examiner—Robert C. Watson
Attorney, Agent, or Firm—Sughrue, Rothwell, Mion, Zinn and Macpeak

[57] ABSTRACT

The mandrel has a cylindrical body provided at the periphery with a plurality of jaws which are capable of radial displacement under the action of control means. Each jaw is supported by two radial columns which are capable of translational motion and each placed at one end of the jaw. Both support columns are driven by means of two first crank-arms rigidly fixed to two toothed wheels which are disposed in meshing engagement with each other, one toothed wheel being coupled with a second crank-arm. An actuating rod is mounted in the axis of the mandrel body and capable of translational motion along the axis, the rod being intended to actuate all the second crank-arms which correspond to the plurality of jaws.

8 Claims, 6 Drawing Figures

EXPANDING MANDREL AND A MACHINE FOR THE USE OF SAID MANDREL

This invention relates to an expanding mandrel and to a machine which makes use of said mandrel. One of the potential applications to which the invention is primarily directed is the construction of a machine for performing inspection or testing operations on tires (tyres). Such operations can include any type of scanning or any type of rotational testing.

One type of expanding mandrel which is already known consists of a cylindrical body and of jaws which are usually three in number and arranged on one of the lateral faces of the body. The expandable character of the mandrel jaws is obtained by so designing these latter that they are capable of displacement either radially within grooves provided for this purpose or longitudinally along a cone. As a rule, the jaws of mandrels of this type exert a gripping action on the exterior of the part to be machined or tested.

Another type of expanding mandrel which is also known is constituted by jaws having the shape of cylindrical sectors which are capable of moving radially under the action of the thrust exerted by a component of suitable shape. Mandrels of this type are capable of gripping the interior of the part. Relevant information on this subject can be obtained by referring to French Pat. No. 2,048,176 filed on June 3rd, 1969.

These different mandrels of known types do not usually permit the possibility of gripping parts of substantial internal diameter. Moreover, the permissible degree of expansion of the jaws is in fact relatively limited. In consequence, if the parts to be gripped have diameters which vary to a considerable extent from one part to another, it then becomes necessary to change the mandrel as a function of the parts.

The precise object of the present invention is to provide an expanding mandrel which overcomes the disadvantages mentioned in the foregoing, especially insofar as the mandrel is capable of gripping objects which are both of large size and have highly variable dimensions. This is particularly true in the case of tires. The internal diameter of a tire can be of the order of several tens of centimeters but is subject to considerable variation depending on whether it is an automobile, motor vehicle or aircraft tire.

To this end, the mandrel in accordance with the invention comprises a cylindrical body provided at the periphery with a plurality of jaws which are capable of radial displacement under the action of control means. Among the essential features of the mandrel are the fact that each jaw is supported by two radial columns which are capable of translational motion and each placed at one end of the jaw. Both support columns are driven by means of two first crank-arms rigidly fixed to two toothed wheels which are disposed in meshing engagement with each other, one toothed wheel being coupled with a second crank-arm. A further distinctive feature of the mandrel lies in the fact that an actuating rod is mounted in the axis of the mandrel body and capable of translational motion along said axis, said rod being intended to actuate all the aforesaid second crank-arms which correspond to the plurality of jaws.

In order to control the correct positioning of the mandrel within the interior of the part to be gripped, the mandrel is advantageously provided with a moving plate on its front lateral face and with contact switches mounted between the mandrel body and the moving plate.

In one advantageous alternative embodiment, the means for controlling the expansion of the jaws by means of the axial actuating rod are constituted by a pneumatic jack connected to an electrovalve and associated with a pressostat which is preset at a predetermined pressure.

The present invention is also directed to a machine which makes use of the mandrel as hereinabove defined and which is especially suited to operations performed on objects having variable dimensions. To this end, the machine comprises:
 a spindle coupled to the mandrel,
 a machine body comprising means for controlling the forward motion, withdrawal and rotation of the spindle,
 means for gripping an object and displacing said object along the axis of the mandrel,
 means for gripping the object and comprising a first set of vertical side posts rigidly fixed to a first toothed rack actuated by displacement means and a second set of vertical side posts rigidly fixed to a second toothed rack coupled to the first by means of a toothed wheel mounted on a stationary shaft,
 means for displacing the gripped object and comprising a vertical displacement jack associated with preselected position detectors,
 means for performing an operation on the object gripped by the mandrel.

The characteristic features and advantages of the present invention will in any case become more clearly apparent from the following description of exemplified embodiments which are given by way of explanation and not in any limiting sense, reference being made to the accompanying drawings, wherein.

Figure 1:
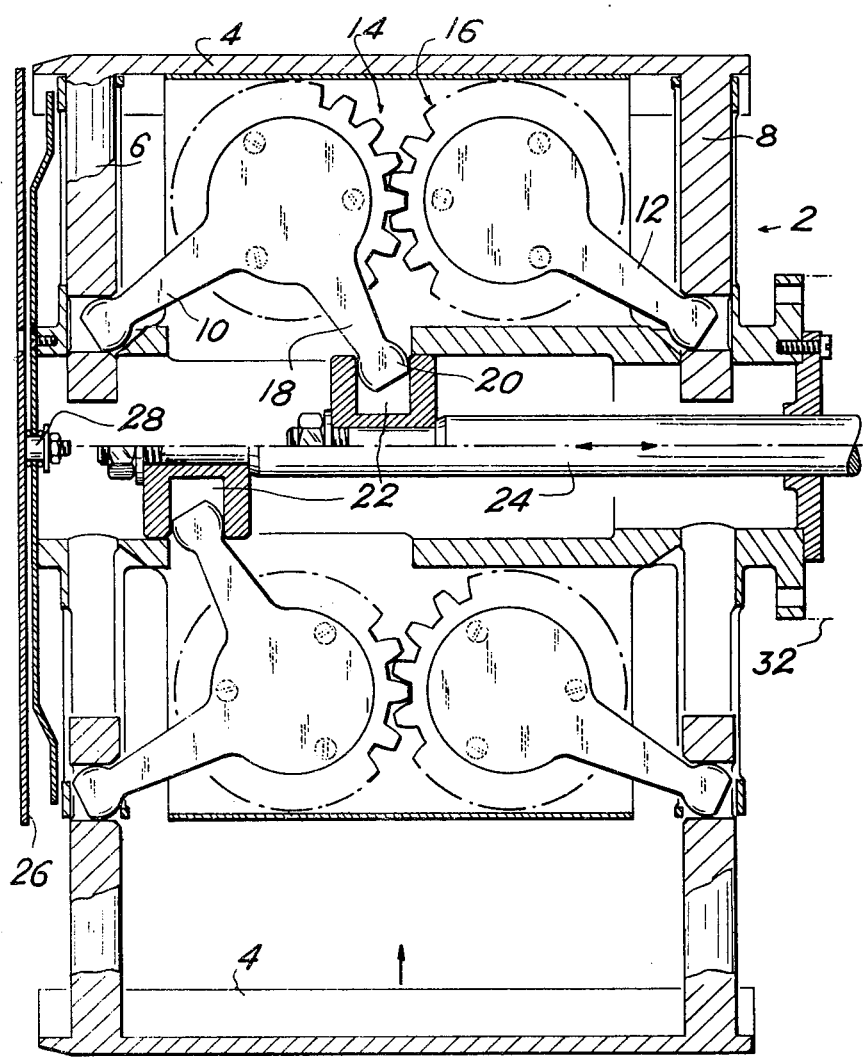
FIG. 1 is a longitudinal sectional view of the mandrel in accordance with the invention and in one particular embodiment.

The mandrel shown in FIG. 1 has a cylindrical body 2 and is fitted with jaws 4 at the periphery of said body (provision being made for any number such as six jaws, intervals of 60°. Each jaw is supported at both ends by means of two columns 6 and 8 which are capable of translational displacement in a radial direction. The movement of said support columns is controlled by two crank-arms 10 and 12 respectively which are rigidly fixed to two toothed wheels 14 and 16 respectively, these latter being disposed in meshing engagement with each other. The wheel 14 is further provided with a crank-arm 18, the head 20 of which engages within a housing 22 provided at the end of an axial actuating rod 24.

The operation of said mandrel takes place as follows. When the axial rod 24 is displaced along the axis of the cylindrical body 2 under the action of driving means (not shown in this figure but described hereinafter), the housing 22 produces action on the crank-arm head 20, thus initiating a movement of rotation of the toothed wheel 14 which drives the toothed wheel 16 in the opposite direction. The two crank-arms 10 and 12 are therefore urged either towards the exterior or towards the interior, depending on the direction of displacement of the actuating rod 24. This has the effect of causing radial displacement of the support columns 6 and 8 and consequently of causing either expansion or withdrawal of the jaws 4.

The upper portion of FIG. 1 shows the position of the different elements when the jaws are fully withdrawn and the actuating rod 24 takes up an end position on the righthand side. The lower portion of said figure shows the position of the elements when the actuating rod has penetrated within the mandrel body and the jaws are in their position of maximum outward extension.

Figure 6:
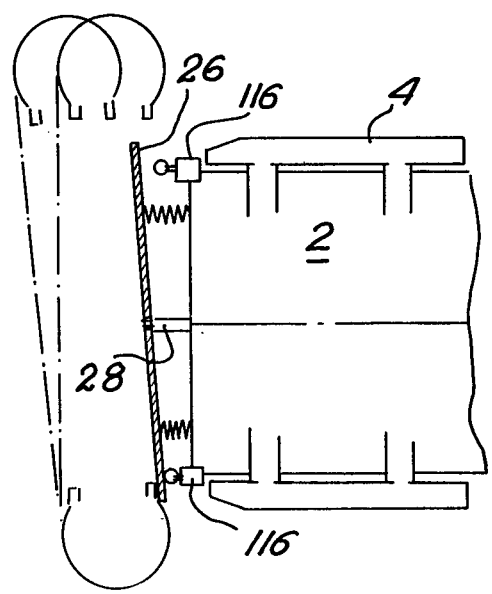
FIG. 6 is a diagrammatic illustration of the control means provided on the front face of the mandrel.

There is also shown in FIG. 1 a front plate 26 which is capable of pivoting about a point 28. Both the structure and the design function of said plate will become apparent from the description give hereinafter with reference to FIG. 6.

FIGS. 2 to 6 illustrate a machine which makes use of the expandable jaws described in the foregoing. The means shown in the figures correspond to a machine for performing an operation on a tire (tyre) but it will be readily understood that some other use could be conceived without thereby departing from the scope of the present invention.

Figure 2:
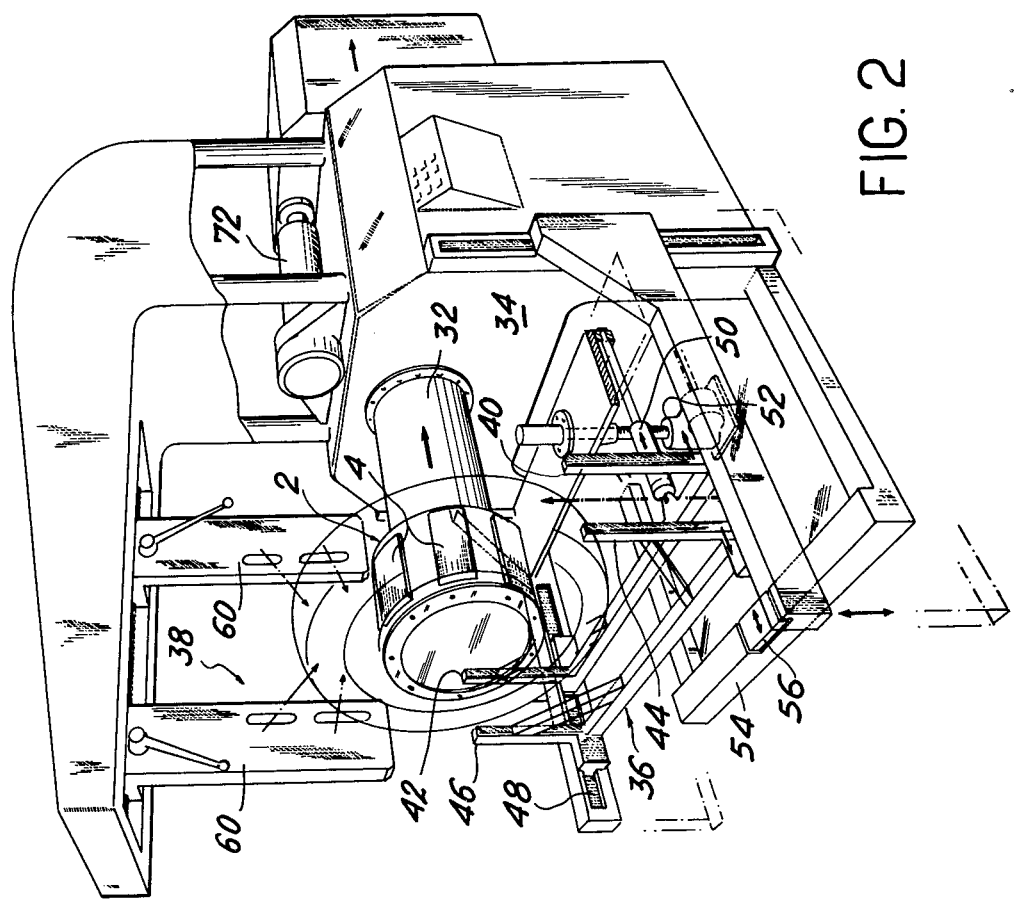
FIG. 2 is a general view of the machine in accordance with the invention.

FIG. 2 is a general view of a machine of this type. The mandrel 30 having expandable jaws is secured to the end of a spindle 32 which is coupled to a machine body 34 provided with means for initiating movements of forward travel, of withdrawal and of rotation of the spindle 32. Said machine body is associated with means 36 for gripping the object and bringing this latter to a position in which it can be gripped by the mandrel 30, and with means 38 for performing an operation on the object.

In one advantageous embodiment, the means 36 for gripping the object comprise a first set of vertical side posts 40 and 42 and a second set 44 and 46, said side posts being controlled by means of a toothed rack system 48 driven by a jack 50 as will become clearer in the description given below with reference to FIG. 4. The complete assembly of vertical side posts and of the gripped object is capable of vertical displacement by means of a screw jack 52.

The machine is further provided in the lower part of this latter with a support plate 54, the central portion 56 of which is constituted by a freely movable sliding plate which serves to restore the tire to the vertical position at the time of clamping by means of the side posts.

In regard to the testing operation means 38, said means can be constituted by probes 58 which are capable of displacement on support brackets 60; said support brackets can be locked in positions adapted to the dimensions of the tire. Said probes can be constituted by any measuring detector which may or may not be in contact with the tire (ionizing radiation detector or infrared detector, sonic or ultrasonic detectors, capacitive or inductive transducers and so forth).

Figure 3:
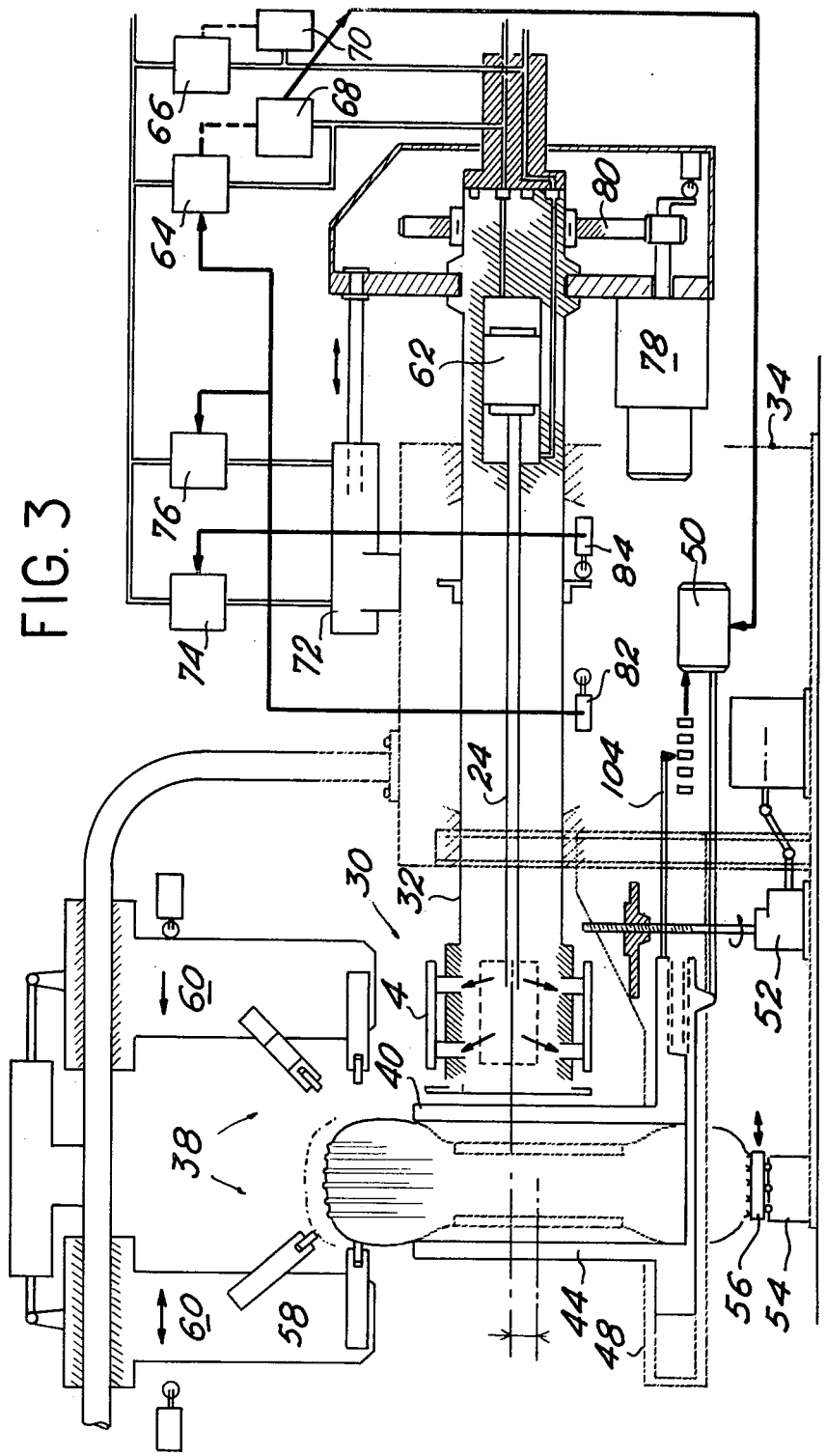
FIG. 3 is a diagram illustrating the operation of the means for initiating expansion of the jaws, displacement of the spindle and positioning of the object.

FIG. 3 is a diagram which serves to illustrate the principle of operation of these different elements. The means described above in connection with FIGS. 1 and 2 are again shown in this figure and bear the same references but are shown in diagrammatic form. This figure also illustrates the structure of the means for controlling the expansion of the jaws and the movement of the spindle. These means are constituted by a pneumatic jack 62 which produces action on the axial rod 24. As described in connection with FIG. 1, the movement of said axial rod 24 serves to modify the spacing of the jaws 4 of the mandrel 30. The pneumatic jack 62 is controlled by electrovalves 64 and 66 respectively for expansion and withdrawal of the jaws. Said electrovalves are connected to pressostats 68 and 70 respectively for expansion and withdrawal. Said pressostats are preset at predetermined pressures and are capable of closing the electrovalves with which they are associated in order to stop the operation which controls the movement of the jaws.

Advance and withdrawal of the spindle are obtained by means of a pneumatic jack 72 controlled by electrovalves 74 and 76 respectively for withdrawal and advance of the spindle. Contact switches 82 and 84 serve to establish the range of travel of the spindle. The movement of rotation of said spindle is produced by a motor 78 coupled to the spindle body 32 by means of a free wheel 80.

Figure 4:
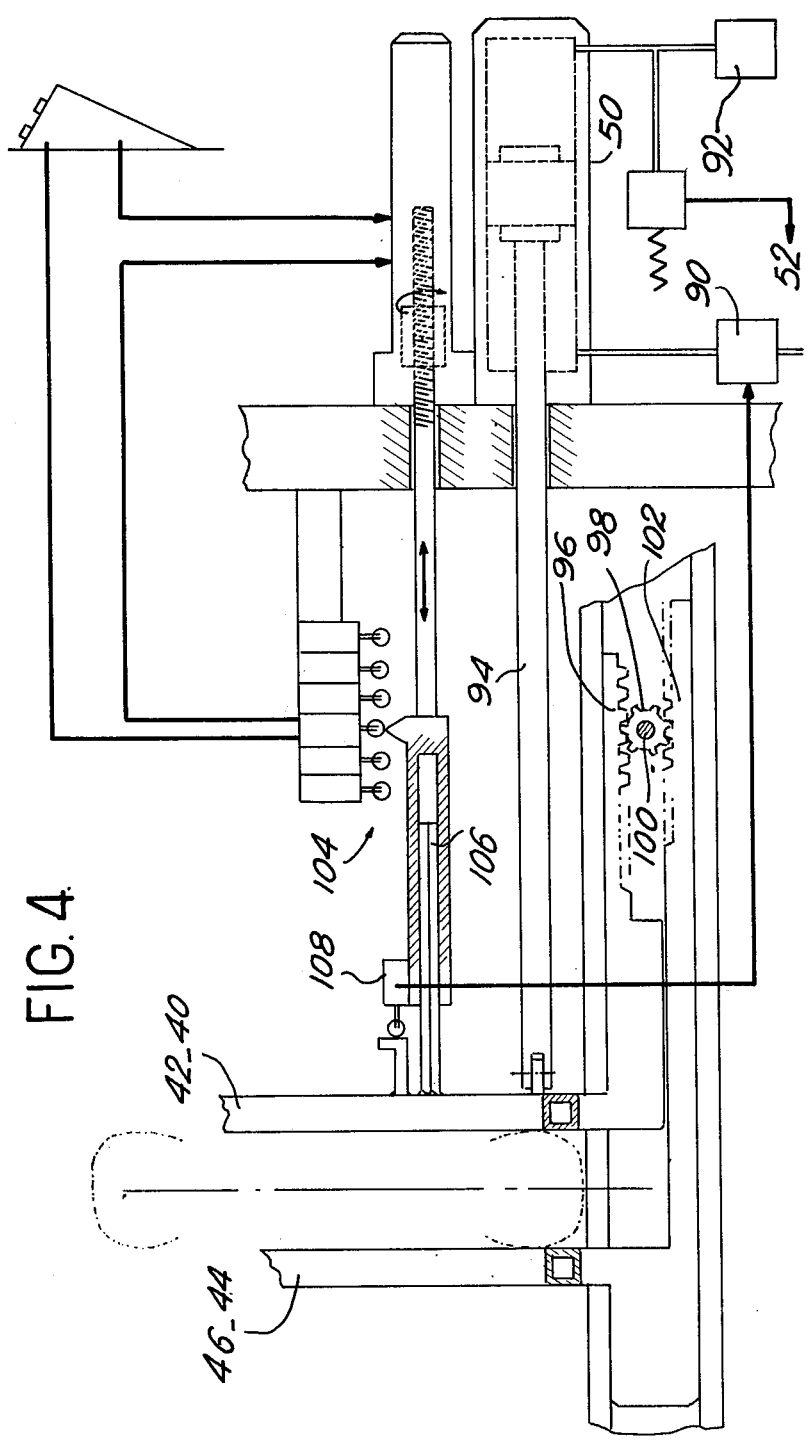
FIG. 4 is a diagram illustrating the operation of the vertical side posts for gripping the object.

The movement of closure of the vertical side posts for producing a clamping action is obtained by means of a jack 50 in accordance with a mechanism which is shown in greater detail in FIG. 4. These means make it possible to grip the tire on which a testing operation is to be performed and comprise said pneumatic jack 50 which is controlled by electrovalves 90 and 92 respectively for the movement of separation and closure of the side posts. The electrovalve 92 is connected to a pressostat 93 which is preset at a predetermined pressure. A control rod 94 is coupled to the first set of vertical side posts (only the front post 40 appears in the figure) which is rigidly fixed to a toothed rack 96. Said rack is disposed in meshing engagement with a wheel 98 mounted on a stationary shaft 100 and in turn disposed in meshing enegagement with a second toothed rack 102 which supports the second set of vertical side posts, only the post 44 being shown in the figure. The assembly is completed by position detectors 104 associated with a selecting screw jack 106 and a limit switch 108.

The operation of the means described in the foregoing takes place as follows. The jack 50 controls the displacement of the rod 94 and the clamping or release of the vertical side posts. The pressure within the rear chamber of the jack 50 increases during the clamping action of the side posts and the action of the jack is discontinued when said pressure attains the set pressure established within the pressostat 93. The means 104, 106 and 108 serve to preset the initial position of the side posts as a function of the dimension of the object to be gripped.

Figure 5:
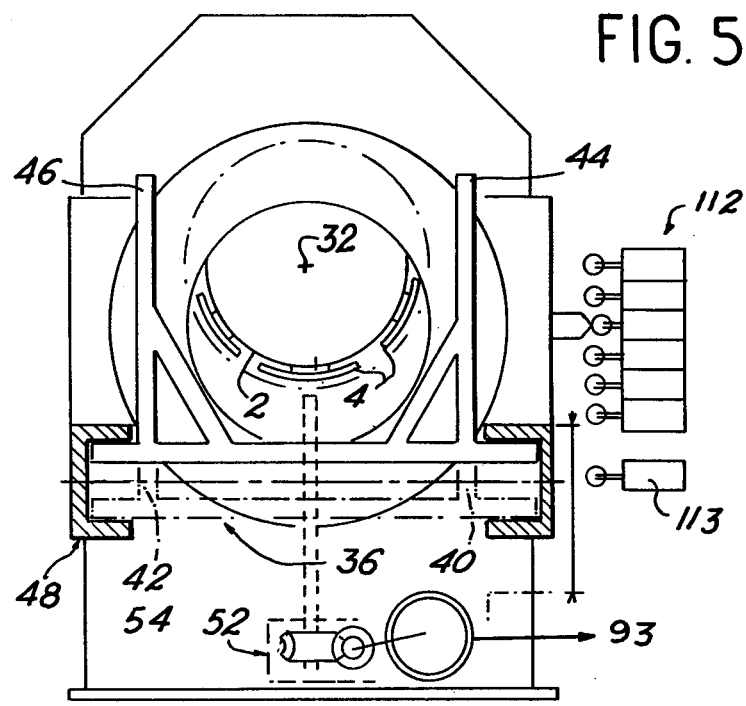
FIG. 5 is a diagram illustrating the operation of the means for vertical displacement of the object which has been gripped by the side posts.

FIG. 5 illustrates the means for producing a vertical displacement of all the side posts. Said means are essentially constituted by a screw jack 52 and a set of position detectors 112 (top position) and 113 (bottom position). The detectors 112 are preset so as to stop the operation of the jack 110 when all the vertical side posts and the object gripped have reached the suitable height at which the object is located in the axis of the mandrel.

When this position of the object has been obtained, the means for advancing the spindle and the mandrel are actuated in order to ensure that said mandrel penetrates into the interior of the tire. To this end, it is an advantage to provide the front face of the mandrel with means for detecting any faulty positioning of the tire which may occur. These means are shown diagrammatically in FIG. 6 which shows a front plate 26 placed in front of the mandrel body 2 and capable of moving about the point 28 and contact switches 116 mounted between said plate and said mandrel body.

In the event that the tire to be gripped is not located in the axis of the mandrel, the front plate 26 of said mandrel comes up against the tire and actuates the switches 116, thus making it possible to interrupt the forward travel of the spindle in order that such faulty positioning may be remedied.

All the essential means constituting the machine in accordance with the invention having thus been described in the foregoing, the performance of the different operations involved in testing or inspection of a tire can now be indicated in broad outline, reference being again made to FIG. 3.

After switching-on the installation, the first operation consists in carrying out a preselection of the means for controlling the position-setting of the tire, namely means 104 for determining the position of the vertical side posts and means 112 for determining the range of vertical displacement of all the side posts. When the selecting jack 106 is in the correct position, a signal is emitted by the switch 108 which initiates opening of the side posts by means of the electrovalve 90 which produces action on the pneumatic jack 50. The machine is then in readiness for loading.

The operator introduces the tire on which it is desired to perform an operation by placing the tire on the sliding plate 56 of the bottom plate 54. The tire-clamping order is given and the pneumatic jack 50 controlled by the electrovalve 92 initiates closure of the vertical side posts. When the side posts come into contact with the tire, the pressure rises to the point of coincidence with the pressure which has been set in the clamping pressostat 93. This set value of pressure is determined during preliminary tests as a function of different types of tires. The pressostat 93 then cuts-off the current supply to the side post closure electrovalve 92.

The tire having thus been clamped in position, the pressostat 93 transmits an order to the jack 52 for initiating the upward movement of the side posts. This upward displacement takes place until the means 112 indicate that the center of the tire is located in the axis of the spindle, this being effected by emission of an order for stopping the vertical displacement system 52 and initiating the forward movement of the spindle.

Said spindle is then advanced by the jack 72 under the control of the electrovalve 76. When the spindle reaches the center of the tire, the position detector 82 cuts-off the supply of current to the electrovalve 76.

The spindle having thus reached the "forward" position, the jaw-expansion order is given by means of the detector 82 to the electrovalve 64 which controls the pneumatic jack 62. When the jaws come into contact with the tire, the pressure within the jack 62 rises to the point of coincidence with the pressure which has been set in the pressostat 68. Once again, this set value of pressure is determined beforehand by means of tests carried out as a function of different types of tires. The change of state of the pressostat interrupts expansion of the jaws whilst the jack 62 nevertheless remains supplied in order to ensure correct and continuous application of the tire against the jaws.

The jaws being tightly applied within the interior of the tire, the order for separating the side posts is given to the jack 50 by means of the jaw-expansion pressostat 68, whereupon the downward motion of the side-post system is initiated. The tire is then in position for a testing operation.

The operator moves the probes 38 by hand towards the tire until they come into contact with this latter. The position of the probes is determined by means of position detectors which can serve if necessary to energize probe-positioning safety relays in order to prevent ineffective scanning rotation which may result from a badly positioned probe. When the probes are in position, the operator can set the spindle in rotation after having positioned the tire at the desired point by means of the free wheel 80. Setting in rotation is carried out by starting-up the motor 78. The rotation can be stopped either manually or automatically by means of a position detector.

We claim:

1. An expanding mandrel comprising a cylindrical body provided at the periphery with a plurality of jaws which are capable of radial displacement under the action of control means, wherein each jaw is supported by two radial columns which are capable of translational motion and each placed at one end of the jaw, both support columns being driven by means of two first crank-arm rigidly fixed to two toothed wheels disposed in meshing engagement with each other, one toothed wheel being coupled with a second crank-arm, and wherein an actuating rod is mounted in the axis of the mandrel body and capable of translational motion along said axis, said rod being adapted to actuate all the aforesaid second crank-arms which correspond to said plurality of jaws.

2. A mandrel according to claim 1, wherein said mandrel comprises a pneumatic jack connected to an electrovalve, said jack being associated with a pressostat which is preset at a predetermined pressure, said jack being intended to produce action on one end of the rod which is located in the axis of the mandrel body.

3. A mandrel according to claim 1, wherein said mandrel is provided with a moving plate on a lateral face of the mandrel body and with contact switches mounted between said mandrel body and said moving plate.

4. A machine comprising an expanding mandrel,
a spindle coupled to the mandrel,
a machine body comprising means for controlling the forward motion, withdrawal and rotation of said spindle,
means for gripping an object and displacing said object along the axis of the mandrel,
said means for gripping the object comprising a first set of vertical side posts rigidly fixed to a first toothed rack actuated by displacement means and a second set of vertical side posts rigidly fixed to a second toothed rack coupled to the first toothed rack by means of a toothed wheel mounted on a stationary shaft,
means for displacing the gripped object comprising a vertical displacement jack associated with preselected detectors, and
means for performing an operation on the object gripped by the mandrel,
said expanding mandrel comprising a cylindrical body provided at the periphery with a plurality of jaws which are capable of radial displacement under the action of control means, wherein each jaw is supported by two radial columns which are capable of translational motion and each placed at one end of the jaw, both support columns being driven by means of two first crank-arms rigidly fixed to two toothed wheels disposed in meshing engagement with each other, one toothed wheel being coupled with a second crank-arm, and wherein an actuating rod is mounted in the axis of the mandrel body and capable of translational motion along said axis, said rod being adapted to actuate all the foresaid second crank-arms which correspond to said plurality of jaws.

5. A machine according to claim 4, wherein the means for displacing the first toothed rack are constituted by a pneumatic jack controlled by an electrovalve associated with a pressostat which is preset at a predetermined pressure.

6. A machine according to claim 4, wherein the movement of advance and withdrawal of the spindle is obtained by means of a pneumatic jack controlled by an electrovalve and associated with a position detector.

7. A machine according to claim 5, wherein the pressostat for initiating expansion of the mandrel jaws also controls the pneumatic jack for initiating the movement of the vertical side posts.

8. A machine according to claim 4, wherein said machine is provided in the lower part thereof with a support plate on which the object is placed before being gripped by the vertical side posts, said support plate being fitted with a freely-mounted plate at the point of contact with the object.

* * * * *